United States Patent
Kang et al.

(10) Patent No.: US 11,244,107 B1
(45) Date of Patent: Feb. 8, 2022

(54) ELECTRONIC APPARATUS FOR PROVIDING INFORMATION AND DATA PROVIDING METHOD THEREOF

(71) Applicant: Coupang Corp., Seoul (KR)

(72) Inventors: Young Shin Kang, Seoul (KR); Seung Hoon Park, Seoul (KR); Hong Gyem Kim, Seoul (KR); Seung Jin Oh, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/161,012

(22) Filed: Jan. 28, 2021

(30) Foreign Application Priority Data

Jan. 6, 2020 (KR) ........................ 10-2021-0001435

(51) Int. Cl.
*G06F 17/00* (2019.01)
*G06F 40/186* (2020.01)
*G06F 40/106* (2020.01)
*G06Q 10/10* (2012.01)

(52) U.S. Cl.
CPC ........... *G06F 40/186* (2020.01); *G06Q 10/10* (2013.01)

(58) Field of Classification Search
CPC .... G06F 40/186; G06F 40/174; G06F 40/106; G06Q 10/10
USPC .............. 715/221, 243, 255, 275, 788, 844; 382/270
See application file for complete search history.

(56) References Cited

U.S. PATENT DOCUMENTS

| | | | | |
|---|---|---|---|---|
| 6,700,971 | B1* | 3/2004 | Cohen | H04M 3/5233 379/265.05 |
| 8,811,597 | B1* | 8/2014 | Hackbarth | G06Q 10/06393 379/266.08 |
| 2008/0071899 | A1 | 3/2008 | Odaka et al. | |
| 2010/0318409 | A1* | 12/2010 | Mayer | G06Q 10/067 705/325 |
| 2012/0047421 | A1* | 2/2012 | Holman | G06Q 10/1091 715/202 |
| 2013/0322754 | A1* | 12/2013 | Lee | G06T 7/11 382/171 |
| 2018/0220279 | A1 | 8/2018 | Jung et al. | |

FOREIGN PATENT DOCUMENTS

| | | |
|---|---|---|
| JP | 2002-041502 A | 2/2002 |
| JP | 2008-071157 A | 3/2007 |
| JP | 2015-069308 A | 4/2015 |
| KR | 10-2005-0021041 A | 3/2005 |
| KR | 10-0702354 B1 | 4/2007 |
| KR | 10-1221364 B1 | 1/2013 |
| KR | 10-2014-0127116 A | 11/2014 |
| KR | 10-2016-0067807 A | 6/2016 |
| KR | 10-2016-0106305 A | 9/2016 |

(Continued)

*Primary Examiner* — Manglesh M Patel
(74) *Attorney, Agent, or Firm* — Knobbe Martens Olson & Bear LLP

(57) ABSTRACT

A method of an electronic apparatus for providing information related to a fulfillment center, wherein the method includes confirming data request information for requesting data related to the fulfillment center, acquiring first data corresponding to the data request information from at least one other apparatus connected to the electronic apparatus, and generating second data by processing the first data based on template information corresponding to the data request information.

15 Claims, 7 Drawing Sheets

Fulfillment center "A"

Based on Order Date (2020-12-01)
Total Outbound Unit: 3,891,932

- Total units (accumulated annually)

| Delivery type | unit |
|---|---|
| Fresh food | 12,964 |
| General delivery | 911,564 |

- Recent history (1 week)

| Delivery type | unit |
|---|---|
| Fresh food | 355 |
| General delivery | 171,564 |

(56) References Cited

FOREIGN PATENT DOCUMENTS

| | | | |
|---|---|---|---|
| KR | 10-2018-0054403 | A | 5/2018 |
| KR | 10-2018-0090120 | A | 8/2018 |
| KR | 10-2018-0122275 | A | 11/2018 |

\* cited by examiner

FIG. 4

| Subscription ID | Mail Template | Subscriber |
|---|---|---|
| 14 | FC&HUB Scorecard-S {yyyy-MM-dd HH:00} (ID: 4) | erikrehn |
| 15 | FC&HUB Scorecard-S {yyyy-MM-dd HH:00} (ID: 4) | ryamp |
| 16 | FC&HUB Scorecard-S {yyyy-MM-dd HH:00} (ID: 4) | bomkim |

| Fulfillment center "A" | |
|---|---|
| | Based on Order Date (2020-12-01) |
| | Total Outbound Unit: 3,891,932 |

- Total units (accumulated annually)

| Delivery type | unit |
|---|---|
| Fresh food | 12,964 |
| General delivery | 911,564 |

- Recent history (1 week)

| Delivery type | unit |
|---|---|
| Fresh food | 355 |
| General delivery | 171,564 |

FIG. 6

| Fulfillment center "A" | |
|---|---|
| | Based on Order Date (2020-12-01) |
| | Total Outbound Unit: 3,891,932 |

- Total units (accumulated annually)

| Delivery type | unit |
|---|---|
| Fresh food | 12,964 |
| General delivery | 911,564 |

- Recent history (1 week)

| Delivery type | unit |
|---|---|
| Fresh food | 355 |
| General delivery | 171,564 |

FIG. 7

| Mail | | |
|---|---|---|
| Write mail | | |
| Inbox 1 | Mail search 🔍 | Fulfillment center "A" |
| Sent | | |
| Drafts | All items | |
| Deleted messages | ▽ Today | Based on Order Date (2020-12-01) |
| | tipsware | Total Outbound Unit: 3,891,932 |
| | Data request information 12:31 pm | |
| | Administrator | • Total units (accumulated annually) |
| | Evening study meeting 11:10 am | |

• Total units (accumulated annually)

| Delivery type | unit |
|---|---|
| Fresh food | 12,964 |
| General delivery | 911,564 |

• Recent history (1 week)

| Delivery type | unit |
|---|---|
| Fresh food | 355 |
| General delivery | 171,564 |

ELECTRONIC APPARATUS FOR PROVIDING INFORMATION AND DATA PROVIDING METHOD THEREOF

BACKGROUND

Technical Field

The present disclosure relates to an electronic apparatus for providing information according to a template based on data request information, and data providing method thereof.

Description of the Related Art

A fulfillment center is a facility that stores items temporarily or for a long time to quickly deliver the items. As e-commerce has become active, the need for fulfillment centers has increased, and furthermore, there is an increasing demand for methods of more effectively managing and using fulfillment centers.

Prior Art Document: Korean Patent Laid-Open Publication No. 2016-0106305

The prior art document discloses a real-time delivery location tracking method. However, the prior art document discloses only features of obtaining desired information related to logistics through a fixed information transmission/reception method between specific nodes, and does not disclose a method of adaptively providing information desired by a user.

In this respect, there is a need to identify information related to a fulfillment center and quickly process work related to the fulfillment center according to situations indicated by the identified information. For example, when it is found that a processing speed of work assigned to a fulfillment center is significantly lower than an average processing speed, there is a need to find the cause to smoothly perform the work of the fulfillment center. To this end, there is a need for a method of effectively acquiring information related to a fulfillment center and providing the acquired information appropriately.

SUMMARY

Technical Goals

An aspect provides an electronic apparatus for more efficiently managing a fulfillment center by acquiring data related to a fulfillment center from a related apparatus and providing the acquired data to an apparatus requiring data to allow the apparatus requiring data to easily confirm the data, and an information providing method of the same.

Another aspect provides a method and system for receiving a report on a type of data that a user wants in a desired format at a desired time.

The technical goals to be achieved by the example embodiments of the present disclosure are not limited to the technical goals described above, and other technical goals may be inferred from the following example embodiments.

Technical Solutions

According to a first aspect of the present disclosure, there is provided a method of providing information by an electronic apparatus for providing information related to a fulfillment center, the method including confirming data request information for requesting data related to the fulfillment center, acquiring first data corresponding to the data request information from at least one other apparatus connected to the electronic apparatus, and generating second data by processing the first data based on template information corresponding to the data request information.

According to a second aspect of the present disclosure, there is provided a non-transitory computer-readable recording medium recorded with a program allowing a computer to execute a method of providing information by an electronic apparatus for providing information related to a fulfillment center including confirming data request information for requesting data related to the fulfillment center, acquiring first data corresponding to the data request information from at least one other apparatus connected to the electronic apparatus, and generating second data by processing the first data based on template information corresponding to the data request information.

According to a third aspect of the present disclosure, there is provided an electronic apparatus for providing information related to a fulfillment center, the electronic apparatus including: a memory that stores an instruction and a processor, in which the processor is connected to the memory to confirm data request information for requesting data related to the fulfillment center, acquire first data corresponding to the data request information from at least one other apparatus connected to the electronic apparatus, and generate second data by processing the first data based on template information corresponding to the data request information.

Detailed contents of other example embodiments are described in a detailed description and are illustrated in the accompanying drawings.

Effects

According to an electronic apparatus for providing the information related to the fulfillment center and a method of providing information thereby according to the present disclosure, data related to the fulfillment center can be acquired from the related apparatus and the acquired data can be provided to the apparatus requiring data to allow the apparatus requiring data to easily confirm the data, thereby effectively managing the distribution data.

In addition, according to the electronic apparatus for providing the information related to the fulfillment center and the method for providing the information thereby according to the present disclosure, data can be easily confirmed by processing and providing the data in an appropriate template according to the type of data acquired from another apparatus.

In addition, according to the electronic apparatus for providing the information related to the fulfillment center and the method of providing information thereby according to the present disclosure, next data request time can be controlled based on the difference between the data request time and the data acquisition time to minimize the data error due to the time required for the data acquisition, thereby providing more accurate and reliable data.

Effects of the present disclosure are not limited to the above-described effects, and other effects that are not described will be clearly understood by those skilled in the art from the description of the claims.

BRIEF DESCRIPTION OF THE DRAWINGS

FIG. 4 is a diagram illustrating an example of a data providing list generated by the electronic apparatus according to the example embodiment.

FIG. 5 is a diagram illustrating an example of data provided by the electronic apparatus according to the example embodiment.

FIG. 6 is a diagram illustrating another example of data provided by the electronic apparatus according to the example embodiment.

FIG. 7 is a diagram illustrating an example in which data is transmitted by the electronic apparatus according to the example embodiment and is displayed on another apparatus.

DETAILED DESCRIPTION

General terms that are currently widely used are selected as terms used in example embodiments in consideration of functions in the present disclosure but may be changed depending on the intention of those skilled in the art or a judicial precedent, the emergence of a new technique, and the like. In addition, in specific cases, there may be terms arbitrarily chosen by the applicant. In this case, the meaning of such a term will be described in detail in a corresponding description portion. Therefore, the terms used in the present disclosure should be defined on the basis of the meanings of the terms and the content throughout the present disclosure rather than the simple names of the terms.

Throughout the specification, unless otherwise specified, "including" any component means that other components may be further included rather than excluding other components.

The expression "at least one of a, b, and c" described throughout the specification may include "a alone," "b alone," "c alone," "a and b," "a and c," "b and c," or "all of a, b, and c."

An "electronic apparatus" described below may also be referred to as an electronic device and may be implemented as a computer or a portable terminal capable of accessing a server or another electronic apparatus through a network. Here, computers may include, for example, a notebook, a desktop, a laptop, and the like, which are equipped with a web browser, and portable terminals are wireless communication devices that ensure portability and mobility, and may include, for example, International Mobile Telecommunications (IMT), code division multiple access (CDMA), W-code division multiple access (W-CDMA), and Long Term Evolution (LTE) terminals, and all kinds of handheld-based wireless communication devices, such as a smartphone and a tablet PC.

In the following description, example embodiments of the present disclosure will be described in detail with reference to the drawings so that those skilled in the art can easily carry out the present disclosure. However, the present disclosure may be implemented in various different forms but it is not limited to the example embodiments described herein.

Hereinafter, example embodiments of the present disclosure will be described with reference to the drawings.

Figure 1:
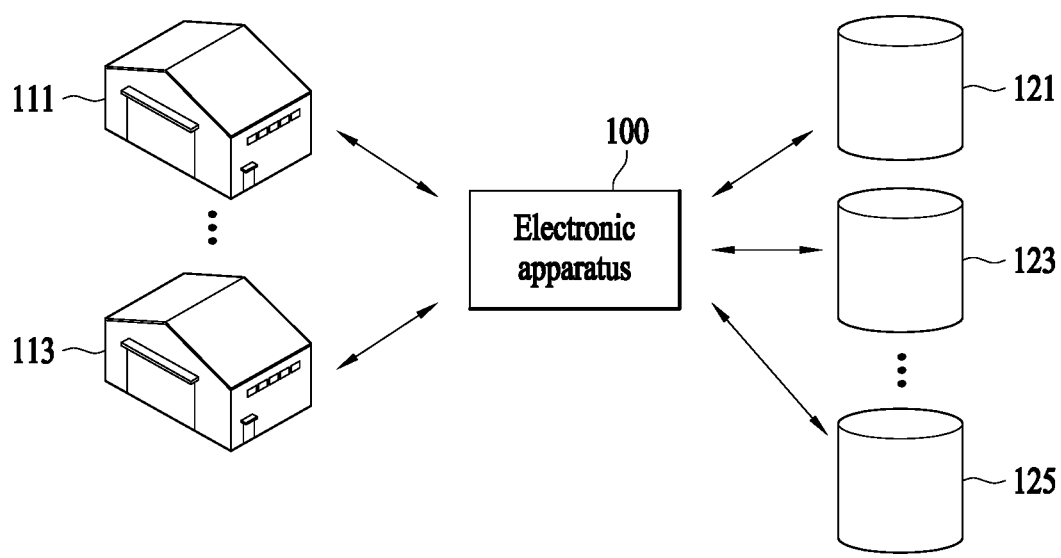
FIG. 1 is a diagram illustrating a relationship between an electronic apparatus for providing information, which is related to a fulfillment center, and another apparatus according to an example embodiment.

FIG. 1 is a diagram illustrating a relationship between an electronic apparatus for providing information, which is related to a fulfillment center, and another apparatus according to an example embodiment.

Referring to FIG. 1, the electronic apparatus 100 may be connected to an apparatus related to each of one or more fulfillment centers 111 and 113 and one or more other apparatuses 121, 123, and 125 including data.

In an example embodiment, the apparatus related to the first fulfillment center 111 may include at least one of an apparatus for management of the first fulfillment center 111, an apparatus used by the administrator of the first fulfillment center 111, and an apparatus for requesting information related to the first fulfillment center 111. The apparatus related to the first fulfillment center 111 may transmit data request information for requesting data to the electronic apparatus 100. When the electronic apparatus 100 confirms the data request information, the electronic apparatus 100 may acquire data corresponding to the data request information from one or more other apparatuses 121, 123, and 125 according to the data request information, and transmit the acquired data to the apparatus related to the first fulfillment center 111.

The data request information is information on or regarding data to be acquired by the apparatus related to the first fulfillment center 111 and may include, for example, at least one of a time at which data is to be received, a kind of data, and a type of data. When the electronic apparatus 100 confirms the data request information, the electronic apparatus 100 may acquire data from one or more other apparatuses 121, 123, and 125 to provide data according to the data request to the apparatus for requesting data, that is, the apparatus related to the first fulfillment center 111. As a result, the electronic apparatus 100 may provide the data corresponding to the data request information to the apparatus related to the first fulfillment center 111.

In an example embodiment, upon confirming the data request information, the electronic apparatus 100 may confirm the apparatus related to the data request information among the other apparatuses 121, 123, and 125. For example, the electronic apparatus 100 may confirm the type of data request information in response to the confirmation of the data request information. When the type of data request information is confirmed as the first type, an apparatus related to the first type of data among the other apparatuses 121, 123, and 125 may be confirmed. The electronic apparatus 100 may acquire the data corresponding to the data request information by requesting the data corresponding to the data request information from the confirmed apparatus. Here, the type of data request information may include at least one of, for example, a type related to a sale of items, a type related to work progress of the first fulfillment center 111, and a type related to manpower, but is not limited thereto.

In an example embodiment, the electronic apparatus 100 may include template information corresponding to the data request information. Upon confirming the data request information, the electronic apparatus 100 may process data acquired from one or more other apparatuses 121, 123, and 125 based on the template information corresponding to the data request information. The electronic apparatus 100 may provide the processed data to the apparatus related to the first fulfillment center 111. This will be described in detail below.

Referring to FIG. 1, the electronic apparatus 100 may be connected to the apparatus related to the second fulfillment center 113. In this case, the electronic apparatus 100 may apply the operation on the apparatus related to the first fulfillment center 111 to the apparatus related to the second fulfillment center 113. Meanwhile, FIG. 1 is only an exemplary, and the electronic apparatus 100 may be connected to apparatuses related to a larger or smaller number of fulfillment centers and other apparatuses.

Meanwhile, the description is based on acquiring information related to the fulfillment center throughout the example embodiment, but the present disclosure is not limited thereto. In the example embodiment of the present specification, a method of providing data of a desired field for data stored in a specific server or a database to a user according to a template is provided.

Figure 2:
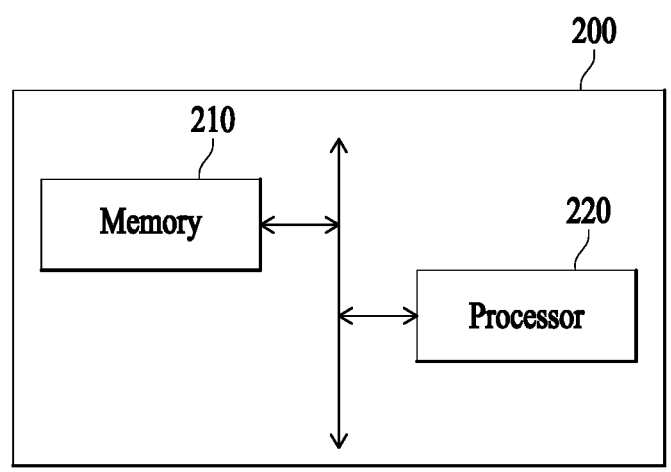
FIG. 2 is a functional block diagram of the electronic apparatus according to the example embodiment.

FIG. 2 is a functional block diagram of the electronic apparatus according to the example embodiment. Although components related to the present example embodiment are illustrated in FIG. 2, the present disclosure is not limited thereto, and other general-purpose components may be further provided in addition to the components illustrated in FIG. 2.

Referring to FIG. 2, an electronic apparatus 200 may include a memory 210 and a processor 220. Each of the memory 210 and the processor 220 is a unit that processes at least one function or operation, which may be implemented by hardware, software, or a combination of hardware and software.

According to an example embodiment, the electronic apparatus 200 of FIG. 1 may be implemented as a server, a computer, or a terminal, and the present specification is not limited by the implementation method of the electronic apparatus 200.

The memory 210 may store various types of data related to the electronic apparatus 200. For example, the memory 210 may store at least one instruction for an operation of the electronic apparatus 200. In this case, the processor 220 to be described below may perform various operations based on the instruction stored in the memory 210.

The processor 220 may be connected to the memory 210 to perform various operations of the electronic apparatus 100.

The processor 220 may confirm data request information for requesting data related to the fulfillment center. The data request information may be acquired from other apparatuses but is not limited thereto. In an example embodiment, the data request information may include a time condition. For example, the data request information may be a request for data on the inventory status of the first fulfillment center at 9:00 am. As another example, the data request information may be a request for data on the inventory status around the first fulfillment center at 3:00 pm. As another example, the data request information may be a request for data on a work processing rate of the first fulfillment center at 6:00 pm on that day.

In an example embodiment, the data request information may be confirmed based on a user input of a first apparatus connected to the electronic apparatus 200. For example, the data request information may be generated by the first apparatus in response to inputting data conditions required by the user of the first apparatus to the first apparatus. For example, the data request information may be generated in response to the time when the required data is to be received and the input of the information on or regarding the required data to the first apparatus.

The processor 220 may acquire first data corresponding to the data request information from at least one other apparatus connected to the electronic apparatus 200. In an example embodiment, upon confirming the data request information, the processor 220 may confirm the apparatus related to the data request information among one or more other apparatuses. The processor 220 may acquire the first data corresponding to the data request information from the confirmed apparatus. For example, when the data request information is data related to a work rate of the first fulfillment center, the processor 220 may confirm the apparatus related to the work rate of the first fulfillment center among one or more other apparatuses and acquire the first data from the confirmed apparatus. In this case, an apparatus corresponding to each piece of data request information (or type of data request information) may be designated in advance.

In an example embodiment, the acquired first data may include raw data corresponding to the data request information. The raw data may include data that has not yet been processed or handled. For example, when the raw data is related to a sensor, the sensing value itself may be included. For example, the first data may include data indicated by the data request information, that is, requested data. When the data request information is information for requesting the work rate of the first fulfillment center, the first data may include work rate data of the first fulfillment center.

In an example embodiment, when the data request information includes a time condition, the processor 220 may acquire the first data from at least one other apparatus according to the time condition. For example, when the time condition is 9:00 am, the processor 220 may acquire the first data from at least one other apparatus at 9:00 am.

In an example embodiment, when at least one other apparatus connected to the electronic apparatus 200 includes a plurality of apparatuses, the processor 220 may confirm the apparatus related to the first data among the plurality of apparatuses based on the information on or regarding the plurality of apparatuses. In some cases, the apparatus related to the first data may be designated in advance, and the processor 220 may confirm the apparatus related to the first data based thereon. The processor 220 may acquire the first data corresponding to the data request information from the confirmed apparatus.

In an example embodiment, at least one other apparatus may include a first server and a second server. When the first server and the second server are apparatuses related to the first data, the processor 220 may acquire data corresponding to the data request information from each of the first server and the second server in parallel. The processor 220 may confirm the first data based on data acquired from each of the first server and the second server. However, the present disclosure is not limited thereto, and in some cases, the processor 220 may obtain data from the first server and the second server regardless of the order or sequentially.

The processor 220 may generate second data by processing the first data based on the template information corresponding to the data request information. The template information may include information for processing the first data to acquire the processed data like the second data. The template information may include, for example, information on or regarding a method of displaying the first data to provide the first data to the user. In this case, the processor 220 may generate the second data by changing at least one of an arrangement, a font size, a font color, and a layout in which the first data is displayed based on the template information. An example of the second data processed based on the template information can be seen with reference to FIG. 5 or 6.

In an example embodiment, the processor 220 may transmit the second data to the first apparatus connected to the electronic apparatus 200. The first apparatus may include the apparatus corresponding to the data request information. For example, the first apparatus may correspond to the apparatus that generates the data request information but is not limited thereto.

In an example embodiment, the data request information may include at least one condition. Specifically, the data request information may include a first condition and a second condition. For example, the first condition may include a time condition, and the second condition may include a condition related to a shipping rate or a work rate of the fulfillment center. Specifically, for example, the first condition may include at least one of a specific time of day (for example, 9:00 am) and a specific time interval. The second condition may include, for example, at least one of a shipping rate, a shipping amount, a shipping speed, a workload, a work rate, and a work speed of the first fulfillment center. However, the present disclosure is not limited thereto, and conditions for various types of information requested by a user may be included.

In this case, the processor 220 may transmit the second data to the first apparatus connected to the electronic apparatus in response to satisfying at least one of the first condition and the second condition. For example, when the first condition is 9:00 am and the second condition includes a case where the shipping rate is less than 30%, the processor 220 may transmit the second data to the first apparatus when at least one of 9:00 am and the shipping rate of less than 30% is satisfied.

In an example embodiment, when the transmission condition of the second data is related to the shipping rate or the work rate of the first fulfillment center, the processor 220 acquires data from at least one other apparatus at a specific time interval (for example, 1 minute) to confirm whether the shipping rate satisfies the conditions. The processor 220 may generate the second data based on the acquired data when the shipping rate satisfies the conditions. When the second data is generated, the processor 220 may transmit the second data to the first apparatus connected to the electronic apparatus 200.

In an example embodiment, the data request information may be typified. For example, the data request information may correspond to one of a plurality of predetermined types. The type of data request information may correspond to, for example, a first type in which data related to the fulfillment center includes data of a certain size or more, a second type in which data related to the fulfillment center includes a certain amount of text or more, or a third type in which data related to the fulfillment center includes a certain number of images or more. Here, the first type may correspond to the case where the data request information is information for requesting accumulated data, the second type may correspond to the case where the data request information is information for requesting data (which may be designated in advance) indicated by numbers, and the third type may correspond to the case where the data request information is information for requesting an image.

In some cases, the type of data request information may include the first type in which the time condition is included in the first time range, and the second type in which the time condition is included in the second time range in response to the data request information including a time condition. For example, the first type may include a type that corresponds to daytime hours (for example, 9:00 am to before 5:00 pm) and the second type may include a type that corresponds to nighttime hours (for example, 5:00 pm to before 9:00 am). Each of the first time range and the second time range may be designated in advance, and the processor 220 may confirm the type of time condition corresponding to the data request information based on confirming the data request information.

In an example embodiment, the processor 220 may confirm the template information for processing the second data based on the type of data request information. For example, the electronic apparatus 200 may include a plurality of pieces of template information, and the processor 220 may generate the second data by processing the first data using a template corresponding to the type of data request information.

For example, the template information corresponding to the first type may include information for setting brightness of an area in which the second data is displayed to be greater than or equal to a predetermined value. The template information corresponding to the second type may include information for setting the brightness of the area in which the second data is displayed to be less than a predetermined value.

As another example, the template information corresponding to the first type may include the template information that is displayed in black text (or dark text, text whose brightness is less than a predetermined value) on a white background (or a light background, a background having brightness greater than or equal to a predetermined value). The template information corresponding to the second type may include template information displayed as a white background (or a bright background) on black text (or dark text).

In an example embodiment, the template information for processing the first data may be acquired based on a user input. For example, in response to acquiring the data request information, the processor 220 may display a screen for requesting the user input for selecting the template information. The processor 220 may confirm the user input on the displayed screen, and confirm the template information indicated by the confirmed user input as the template information for processing the first data.

In an example embodiment, the screen for requesting the user input for selecting the template information may be provided through the electronic apparatus 200, but is not limited thereto, and may be provided to the first apparatus connected to the electronic apparatus, for example, the apparatus corresponding to the data request information. In this case, the user input may be input by a user of the first apparatus, that is, a user requesting data.

In an example embodiment, the template information may include information on or regarding a template type (for example, a first type and a second type). In this case, the selection of the template information described above may correspond to the selection of the template type.

In an example embodiment, the processor 220 may confirm the template type based on the template information. For example, the processor 220 may confirm the template type based on the template information. When the processor 220 confirms the template type, the processor 220 may identify a candidate apparatus that is expected to provide the second data. The processor 220 may transmit the second data to the selected apparatus based on the selection of one of the candidate apparatuses. In this case, the candidate apparatus that is expected to provide the second data for each template type may be designated in advance. In addition, the selected candidate apparatus may include the electronic apparatus corresponding to the data request information, for example, the apparatus for requesting data, but is not limited thereto.

In an example embodiment, the processor 220 may store the information related to the generation of the second data. The information related to the generation of the second data may store information about at least one of the apparatus to provide the second data, details of the information included in the second data, the template information corresponding to the second data, the information representing the first data, a generation time of the second data, and the information on at least one of the apparatuses corresponding to the data request information corresponding to the second data.

In an example embodiment, the processor 220 may change the information related to the generation of the second data in response to the input to the stored information. When the input to the stored information is confirmed, the processor 220 may change at least some of the information related to the generation of the second data. For example, the processor 220 may change the apparatus that provides the second data or the template information.

In an example embodiment, the second data may include the information on or regarding the time when the processor 220 requests the first data from at least one other apparatus and the information on the time when the processor 220 acquires the first data from at least one other apparatus.

In an example embodiment, the processor 220 may change the information on the data request time included in the data request information based on the information on the difference between the time when the first data is requested and the time when the first data is acquired. Specifically, the processor 220 may confirm information that the time when the first data is requested is 13:34:05 and the time when the first data is acquired is 13:34:59. The processor 220 may determine that the difference between the time when the first data is requested and the time when the first data is acquired is 54 seconds based on the information. Accordingly, the next time the first data is requested, the processor 220 may request the first data at a time 54 seconds earlier than the time when the first data was last requested. For example, the processor 220 may request the first data at 13:34:05 on December 15, and when the information on the difference is confirmed to be 54 seconds, the processor 220 may request the first data at 13:33:11 which is 54 seconds earlier than the existing 13:34:05 on December 16.

In this case, the processor 220 may provide more accurate and up-to-date information by minimizing the data error that may occur due to the difference in the data transmission speed.

Figure 3:
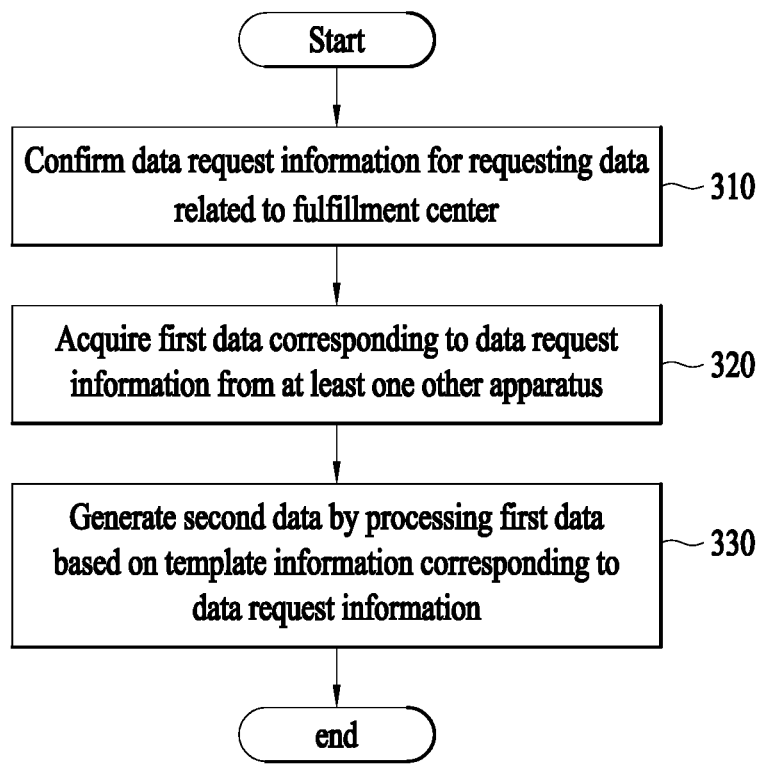
FIG. 3 is a flowchart illustrating a flow of each operation of a method of providing information by an electronic apparatus according to an example embodiment.

FIG. 3 is a flowchart illustrating a flow of each operation of a method of providing information by an electronic apparatus according to an example embodiment. Each operation of the method illustrated in FIG. 3 may be performed in a different order from those illustrated in the drawings in some cases. Hereinafter, content overlapping that described above may be omitted.

Referring to FIG. 3, in operation 310, the electronic apparatus may confirm the data request information for requesting the data related to the fulfillment center.

In an example embodiment, the data request information may be received from the first apparatus connected to the electronic apparatus. In this case, the data request information is the information requested by the first apparatus, and may include, for example, the information selected by the user of the first apparatus among various types of information on or regarding the fulfillment center in which the first apparatus is installed, such as the workload, the work rate, the shipping rate, the shipping amount, or the manpower.

In an example embodiment, the data request information may include a time condition related to the time when the first apparatus intends to receive data. For example, the data request information may include the time information of 9:00 am. In this case, the data corresponding to the data request information may be provided to the first apparatus at 9:00 am every day. When the information on the reception period is further set, data reflecting the reception period may be provided to the first apparatus. For example, when the reception period is one week, the electronic apparatus may provide data to the first apparatus at 9:00 am at one week intervals.

In operation 320, the electronic apparatus may acquire the first data corresponding to the data request information from at least one other apparatus connected to the electronic apparatus. In an example embodiment, the electronic apparatus may be connected to at least one other apparatus. Each of the one or more other apparatuses may store different data. In this case, when the electronic apparatus acquires the data request information, the electronic apparatus may confirm other apparatuses related to the first data to be acquired according to the data request information, and acquire the first data from the confirmed other apparatuses.

In some cases, the data corresponding to the data request information may be divided and stored in a plurality of apparatuses. In this case, the electronic apparatus may acquire the first data based on acquiring data from each of the plurality of apparatuses.

In an example embodiment, when the data request information includes the time condition, the electronic apparatus may acquire the first data from at least one other apparatus according to the time condition. For example, when the time condition is 9:00 am, the electronic apparatus may acquire the first data from at least one other apparatus at 9:00 am.

In an example embodiment, the data request information may include the plurality of conditions. In this case, the electronic apparatus may acquire the first data from at least one other apparatus in response to satisfying at least one of the plurality of conditions.

In an example embodiment, the electronic apparatus may confirm information on a request time and an acquisition time of the first data. In this case, the electronic apparatus may confirm the difference between the request time and the acquisition time of the first data, and update the next acquisition time of the first data based on the confirmed difference.

In operation 330, the electronic apparatus may generate the second data by processing the first data based on the template information corresponding to the data request information. The template information is information for displaying the first data, and the electronic apparatus may generate the second data by changing at least one of an arrangement, a font size, a font color, and a layout in which the first data is displayed using the template information.

In an example embodiment, the template information may be designated in advance by the data request information. In this case, upon acquiring the first data, the second apparatus may generate the second data by processing the first data based on the template information according to the data request information.

In an example embodiment, upon acquiring the first data, the electronic apparatus may confirm the template information corresponding to the type of first data. The electronic apparatus may generate the second data by processing the first data based on the confirmed template information.

Here, the type of first data may be distinguished according to, for example, content indicated by data. For example, the type of first data may be distinguished according to whether the first data is related to sales, the work of the fulfillment center, or the manpower. In some cases, the type of first data may be distinguished according to the type of data included in the first data. For example, the type of first data may be distinguished according to whether an image is a type that includes a predetermined ratio or more, or text is a type that includes a predetermined ratio or more. In another case, the type of first data may be distinguished based on the condition corresponding to the data request information. For example, the type of first data may be distinguished according to a case where the time condition corresponding to the data request information is in a morning time zone and a case where the time condition corresponding to the data request information is in an afternoon time zone.

FIG. 4 is a diagram illustrating an example of a data providing list generated by the electronic apparatus according to the example embodiment. Specifically, FIG. 4 illustrates an example of the data providing list generated based on receiving a plurality of pieces of data request information.

The electronic apparatus may confirm the mutually distinct data request information. For example, the electronic apparatus may receive the information on or regarding the first data request from the first apparatus and the information on the second data request from the second apparatus. At least a part of the first data request information and the second data request information may be distinguished. For example, even if the same data is requested, the time conditions for receiving data may be different. As another example, the first data request information and the second data request information may be information for requesting different data according to different time conditions.

In this case, the electronic apparatus may provide a list representing each piece of data request information as illustrated in FIG. 4. Referring to FIG. 4, a list indicating two data request information items may be provided in response to the confirmation of three pieces of data request information.

Referring to FIG. 4, the electronic apparatus may display template information 410 and corresponding apparatus information 420 related to each piece of data request information. In an example embodiment, such information may be displayed on a management page. The management page may be managed by an electronic apparatus, and subscribers may input additional template information through the management page and subscribe to related information through the input template information. In addition, in an example embodiment, a user may create an additional template based on at least some of the templates input by another user. To this end, the management page may provide a user with an example of the type of information subscribed to by another user and the template information for subscription.

The template information 410 may be designated in advance by the data request information, but is not limited thereto, and may be designated by the electronic apparatus according to data content indicated by the data request information. The corresponding apparatus information 420 is information on the apparatus that transmits the data request information and may include, for example, the name of the apparatus or the user information of the apparatus.

Meanwhile, in an example embodiment, the user may add the template information, and the template information may include information on or regarding the data information to be received and a format for receiving data. By providing such information, each user may adaptively subscribe to specific information.

In addition, in an example embodiment, when the same user subscribes to the same information through another template, the electronic apparatus provides the information on the template to the user so that the user may select the information without receiving the duplicated information through another template. Accordingly, when new subscription information and a template for the new subscription information are input, information related thereto may be provided to the user through comparison with information and templates subscribed to by the existing corresponding user.

In an example embodiment, when an input for selecting one of the plurality of pieces of data request information appearing in the list is received, the electronic apparatus may provide a screen for modifying the data request information corresponding to the input. The data request information may be modified based on a user input on a screen for modifying the data request information.

FIG. 5 is a diagram illustrating an example of the data provided by the electronic apparatus according to the example embodiment. Specifically, FIG. 5 illustrates an example of second data processed according to the template information and provided to another apparatus.

The electronic apparatus may generate the second data by determining the template type corresponding to the first data and processing the first data according to the determined template type. Referring to FIG. 5, the template type may include a first template type in which data is displayed at specific brightness or higher.

The first template type may include, for example, a template type in which data is displayed in a form in which a background is bright and text is dark in response to the background appearing at a first brightness or higher and text appearing at less than a second brightness. The first data to which the first template type is applied may correspond to a case where the acquisition of the first data or the provision of the second data falls within the first time range. When the first time range is daytime, the first template type may improve the usability for the user because it is easier to secure visibility when the surrounding environment is bright.

Meanwhile, in an example embodiment, a time when corresponding information is additionally acquired and time information collected and reported by the corresponding information may be additionally provided to the user. In addition, the electronic apparatus may determine a specific data collection start time based on the information on a time required to collect data for a previous report to a subscriber who takes time to collect the information. In this way, by determining the time to collect the data provided to the user who subscribes through the existing report information, it is possible to provide information to which the user is subscribed at a certain time.

FIG. 6 is a diagram illustrating another example of the data provided by the electronic apparatus according to the example embodiment. Specifically, FIG. 6 illustrates another example of second data processed according to the template information and provided to another apparatus.

Referring to FIG. 6, the template type may include a second template type in which data is displayed at less than a specific brightness.

The second template type may include, for example, the template type in which data is displayed in a form in which the background is bright and the text is dark in response to the background appearing at less than a first brightness and text appearing at a second brightness or higher. The first data to which the second template type is applied may correspond to a case where the acquisition of the first data or the provision of the second data falls within the second time range. When the second time range is nighttime, the second template type may improve the usability for the user because it is easier to secure visibility when the surrounding environment is dark.

In connection with the application of the template type in the case of FIGS. 5 and 6, the electronic apparatus may determine the template type to be applied to the first data based on confirming the time condition corresponding to the data request information. The electronic apparatus may provide the information in a form adaptive to the user's surrounding environment by processing the first data according to the determined template type.

However, the template type is not limited to the above-described example, and various types may exist according to the content of data or the type of data. For example, when data includes a certain amount of text, there may be a template type in which the size, font, spacing, and the like of the text are adjusted to improve visibility, or a template type in which the arrangement of data is adjusted.

FIG. 7 is a diagram illustrating an example in which data is transmitted by the electronic apparatus according to the example embodiment and is displayed on another apparatus. Specifically, FIG. 7 illustrates an example in which the second data is displayed by the apparatus that requests the data when the second data is provided to the apparatus that requests the data.

Referring to FIG. 7, the electronic apparatus may provide the second data in the form of mail to the apparatus corresponding to the data request information. In this case, as illustrated, the second data may be displayed in the form of the information provided in the mail.

The electronic apparatus or terminal according to the above-described example embodiments may include a processor, a memory that stores and executes program data, a permanent storage such as a disk drive, a communication port that communicates with an external device, a touch panel, a key, a user interface device such as a button, and the like. Methods implemented as software modules or algorithms may be stored on a computer-readable recording medium as computer-readable codes or program instructions executable on the processor. Here, examples of the computer-readable recording medium may include magnetic storage media (for example, a read-only memory (ROM), a random-access memory (RAM), a floppy disk, a hard disk, etc.), optical reading media (for example, a compact disc (CD)-ROM or a digital versatile disc (DVD)), and the like. The computer-readable recording medium may be distributed in computer systems connected to each other through a network, and as a result, the computer-readable codes may be stored and executed in a distributed scheme. The medium may be readable by a computer, stored in a memory, and executed on a processor.

The present example embodiment may be represented by functional block configurations and various processing operations. These functional blocks may be implemented by various numbers of hardware and/or software components that execute specific functions. For example, the example embodiment may employ integrated circuit configurations, such as a memory, processing, logic, and a look-up table, capable of executing various functions by control of one or more microprocessors or other control devices. Similar to executing the components in software programming or software elements, the present example embodiment can be implemented in programming or scripting languages such as python, C, C++, Java, and assembler, including various algorithms implemented by a combination of data structures, processes, routines or other programming configurations. Functional aspects may be implemented in algorithms executed on one or more processors. In addition, the present example embodiment may employ a conventional technology for electronic environment setting, signal processing, and/or data processing, and the like. Terms such as "mechanism," "element," "means," and "configuration" may be used broadly and are not limited to mechanical and physical configurations. The terms may include the meaning of a series of routines of software in connection with a processor or the like.

The above-described example embodiments are merely exemplary, and other example embodiments may be implemented within the scope of the following claims.

What is claimed is:

1. A method operable by an electronic apparatus for providing information related to a fulfillment center, the method comprising:
    confirming data request information for requesting data related to the fulfillment center;
    acquiring first data corresponding to the data request information from at least one other apparatus connected to the electronic apparatus; and
    processing the first data based on template information corresponding to the data request information and generating second data, wherein the generating of the second data comprises:
        confirming template information in response to a type of the data request information, and
        generating the second data by changing at least one of an arrangement, a font size, a font color, or a layout in which the first data is displayed based on the confirmed template information,
    wherein the data request information includes a time condition, and the type of the data request information includes a first type in which the time condition is included in a first time range or a second type in which the time condition is included in a second time range,
    wherein the template information corresponding to the first type includes information that sets a brightness of an area in which the second data is displayed to be greater than or equal to a predetermined value, and the template information corresponding to the second type includes information that sets the brightness of the area in which the second data is displayed to be less than the predetermined value.

2. The method of claim 1, wherein the data request information includes a time condition, and
    the acquiring of the first data comprises acquiring the first data from the at least one other apparatus according to the time condition.

3. The method of claim 1, wherein the at least one other apparatus comprises a first server and a second server, and
    the acquiring of the first data comprises acquiring data corresponding to the data request information from the first server and the second server in parallel.

4. The method of claim 1, wherein the acquiring of the first data comprises identifying, in response to the at least one other apparatus including a plurality of apparatuses, an apparatus related to the first data among the plurality of apparatuses and acquiring the first data related to the data request information from the identified apparatus based on information regarding the plurality of apparatuses.

5. The method of claim 1, wherein the data request information is confirmed based on a user input of a first apparatus connected to the electronic apparatus, and
    the method further comprises providing the second data to the first apparatus.

6. The method of claim 1, wherein the data request information includes a first condition and a second condition,
- the method further comprises transmitting the second data to a first apparatus connected to the electronic apparatus in response to satisfying at least one of the first condition or the second condition,
- the first condition includes a time condition, and
- the second condition includes a condition related to a shipping rate or a work rate of the fulfillment center.

7. The method of claim 1, wherein the type of the data request information includes a first type in which the data related to the fulfillment center includes data of a certain size or more, a second type in which the data related to the fulfillment center includes a certain amount of text or more, or a third type in which the data related to the fulfillment center includes a certain number of images or more.

8. The method of claim 1, wherein the template information includes information regarding a template type,
- the template type is acquired based on a user input, and
- the method further comprises:
  - confirming candidate apparatuses to which the second data is to be transmitted in response to confirming the template type based on the template information; and
  - transmitting, in response to at least one candidate apparatus being selected from the confirmed candidate apparatuses, the second data to the selected candidate apparatus.

9. The method of claim 8, wherein the selected candidate apparatus includes another apparatus related to the data request information.

10. The method of claim 1, further comprising:
- storing information related to the generation of the second data, and
- changing the information related to the generation of the second data in response to an input regarding the stored information.

11. The method of claim 10, wherein the information related to the generation of the second data includes template information corresponding to the second data and information representing the first data.

12. The method of claim 1, wherein the second data includes information regarding a time at which the electronic apparatus requests the first data from the at least one other apparatus and information regarding a time at which the electronic apparatus acquires the first data from the at least one other apparatus.

13. The method of claim 12, wherein information regarding data request time included in the data request information is changed based on information regarding a difference between the time at which the first data is requested and the time at which the first data is acquired.

14. A non-transitory computer-readable recording medium recorded with a program allowing a computer to execute the method of claim 1.

15. An electronic apparatus for providing information related to a fulfillment center, the electronic apparatus comprising:
- a memory comprising instructions; and
- a processor,
- wherein the processor is connected to the memory and configured to:
  - confirm data request information for requesting data related to the fulfillment center;
  - acquire first data corresponding to the data request information from at least one other apparatus connected to the electronic apparatus; and
  - generate second data by processing the first data based on template information corresponding to the data request information, wherein the generating of the second data comprises confirming template information in response to a type of the data request information, generating the second data by changing at least one of an arrangement, a font size, a font color, or a layout in which the first data is displayed based on the confirmed template information,
- wherein the data request information includes a time condition, and the type of the data request information includes a first type in which the time condition is included in a first time range or a second type in which the time condition is included in a second time range,
- wherein the template information corresponding to the first type includes information that sets brightness of an area in which the second data is displayed to be greater than or equal to a predetermined value, and the template information corresponding to the second type includes information that sets the brightness of the area in which the second data is displayed to be less than the predetermined value.

* * * * *